United States Patent
Jorgensen

(10) Patent No.: US 9,676,428 B2
(45) Date of Patent: Jun. 13, 2017

(54) TRAILER OVERHANG STORAGE

(71) Applicant: Greg Jorgensen, Winner, SD (US)

(72) Inventor: Greg Jorgensen, Winner, SD (US)

( * ) Notice: Subject to any disclaimer, the term of this patent is extended or adjusted under 35 U.S.C. 154(b) by 0 days.

(21) Appl. No.: 14/995,282

(22) Filed: Jan. 14, 2016

(65) Prior Publication Data

US 2016/0236729 A1 Aug. 18, 2016

Related U.S. Application Data

(60) Provisional application No. 62/116,779, filed on Feb. 16, 2015.

(51) Int. Cl.
*B62D 43/10* (2006.01)
*B62D 43/00* (2006.01)

(52) U.S. Cl.
CPC ........... *B62D 43/002* (2013.01); *B62D 43/10* (2013.01)

(58) Field of Classification Search
CPC ...... B62D 43/06; B62D 43/002; B62D 43/04; B62D 43/01; B62D 63/08
See application file for complete search history.

(56) References Cited

U.S. PATENT DOCUMENTS

| | | | | |
|---|---|---|---|---|
| 2,320,856 A * | 6/1943 | Ehlers | ..................... | B62D 43/06 296/37.2 |
| 4,538,995 A * | 9/1985 | Fryer | ................... | E04B 1/34336 296/24.3 |
| 4,676,415 A * | 6/1987 | Kennedy | ................ | B62D 43/04 224/42.21 |
| 5,027,991 A * | 7/1991 | Braddock | .............. | B62D 43/04 224/42.21 |
| 5,746,473 A | 5/1998 | Crean | | |
| 6,394,533 B1 | 5/2002 | Ladell | | |
| 2005/0179277 A1 | 8/2005 | Schneider | | |
| 2006/0070292 A1* | 4/2006 | Fitzgerald | .............. | A01K 97/06 43/54.1 |
| 2007/0114758 A1 | 5/2007 | Garceau | | |
| 2010/0026019 A1* | 2/2010 | Couto | ..................... | B60R 19/48 293/118 |
| 2015/0061259 A1* | 3/2015 | Fox | ......................... | B60P 3/122 280/415.1 |
| 2016/0001832 A1* | 1/2016 | Beiler | .................... | B62D 59/04 414/550 |

* cited by examiner

*Primary Examiner* — Drew Brown
(74) *Attorney, Agent, or Firm* — Global Intellectual Property Agency, LLC; Daniel Boudwin

(57) ABSTRACT

A trailer vehicle with a forward storage compartment is provided, which maximizes usable space within the trailer vehicle and offers improved storage for the user. The trailer vehicle comprises a towed vehicle with a front overhang portion extending from the front end thereof. The front overhang supports a fifth wheel kingpin connector, and further comprises an enclosed interior volume above the connector. Along a lower surface of the front overhang, one or more storage doors are provided. The storage doors provide access to the interior of the front overhang. Raising and lowering of the storage doors may be assisted by way of a cable winch or fluid-spring struts. Moreover, the storage doors may support specific items, such as spare tires using a tire saddle disposed thereon. Finally, each of the doors is hinged affixed to the overhang and includes securable latches to maintain the doors in a closed state.

12 Claims, 4 Drawing Sheets

TRAILER OVERHANG STORAGE

CROSS REFERENCE TO RELATED APPLICATION

This application claims the benefit of U.S. Provisional Application No. 62/116,779 filed on Feb. 16, 2015. The above identified patent application is herein incorporated by reference in its entirety to provide continuity of disclosure.

BACKGROUND OF THE INVENTION

Field of the Invention

The present invention relates to land vehicles and to vehicle trailer storage compartments. More specifically, the present invention relates to a spare tire and general storage drop down compartment that is disposed within the front overhang of a fifth wheel trailer.

Most fifth wheel trailers include an open frame or enclosed structure, whereby the leading end of the trailer includes a gooseneck (front overhang) extending therefrom for connection to a lead vehicle fifth wheel. The front overhang is used to couple the trailer to the lead vehicle, and therefore is not used for storage. Spare tires for fifth wheel trailers are generally stored outside of the vehicle and are thus subject to road elements, rust, and theft. These reduce the lifespan of the spare tire and wheel, which is a necessary piece of equipment in the event of a blowout or flat.

In addition to spare tire storage, general storage on fifth wheel trailers is limited. The front overhang in particular is generally not utilized for storage space, as it would be inaccessible when the trailer interior is full. The present invention contemplates a new fifth wheel trailer design that utilizes this commonly underutilized space, whereby general storage is provided or specific storage for spare tires is provided.

In particular, the present invention contemplates a storage compartment and an access door along the front overhang of a fifth wheel trailer. The present invention comprises a lowerable door that provides access into the interior volume of the front overhang, whereby the interior volume and the door itself may serve as a storage area. The door may also provide storage specifically adapted to support one or more spare tires. In this manner, the spare tires are supported by the door within the overhang portion, and are accessible by lowering the door. In most embodiments, the overhang portion of the trailer is enclosed. It is also contemplated that the enclosed storage compartment may be added to an otherwise exposed trailer gooseneck. Overall, the present invention protects spare tires and increases useful storage area on a fifth wheel trailer.

SUMMARY OF THE INVENTION

The following summary is intended solely for the benefit of the reader and is not intended to be limiting in any way. The present invention provides a new trailer vehicle that can be utilized for providing convenience for the user when storing spare tires or capitalizing on traditionally unused storage space within a fifth wheel trailer.

It is therefore an object of the present invention to provide a new and improved trailer vehicle that has all of the advantages of the prior art and none of the disadvantages.

It is another object of the present invention to provide a trailer vehicle that comprises a trailer body, wheels, and a leading end. Extending from the leading end of the trailer is a front overhang portion or gooseneck, which supports a fifth wheel trailer kingpin connection for securing the trailer vehicle to a lead vehicle.

Another object of the present invention is to provide a trailer vehicle that comprises a front overhang having a lower surface, a front end, sides, an upper surface, and an interior volume. The trailer vehicle of the present invention comprises a front overhang which is preferably enclosed, thereby providing additional storage space within the trailer and accessible through one or more storage doors along the surface of the front overhang.

Another object of the present invention is to provide a trailer vehicle, wherein the front overhang further comprises one or more storage doors that are substantially aligned with at least one surface of the front overhang when stowed. Each storage door rotates outward when deployed to provide access into the interior of the front overhang.

Another object of the present invention is to provide a storage door having a first edge that is hingedly affixed to the vehicle trailer and a second edge that comprises one or more latches to secure the second edge to the front overhang and the storage door in a stowed state. The one or more storage doors provide access to the interior volume of the front overhang when deployed.

Another object of the present invention is to provide a trailer vehicle that comprises a spool and pulley system to assist movement of the storage door while raising and lowering thereof. The spool and pulley system preferably comprises a cable wound around a spool, whereby the cable extends from the spool to a pulley mounted to the front overhang and above the storage door. The spool is also preferably an electric winch, however manually operated or alternative power sources are contemplated. The cable extending from the spook secures to the storage door, whereby the spool places tension on the cable to assist opening and closing the storage door.

Another object of the present invention is to provide a spool and pulley system for the storage door that utilizes a cable that is removably attached to the storage door after being lowered. In particular, the cable affixes to a hook on the storage door and is releasable therefrom, whereafter the cable can be used to assist lifting items into the front overhang interior.

Another object of the present invention is to provide a trailer vehicle comprising an enclosure disposed within the front overhang. The enclosure is substantially enclosed by the walls of the front overhang, and comprises an interior volume and an opening that is coextensive with the storage door. Access to interior volume of the enclosure is facilitated by the storage doors, which extend from the walls of the front overhang for direct loading of cargo therein.

Another object of the present invention is to provide a storage door having an interior surface that further comprises one or more tire saddles thereon. The tire saddles are disposed adjacent to the second edge of the storage door and each comprises rounded flanges for supporting the outer radius of a tire placed on the interior surface of the storage door. In this way, the tire saddles support a tire on the storage door when the storage door rotates outward.

Another object of the present invention is to provide a front overhang portion that comprises one or more adjacent storage doors that are substantially aligned with each other when stowed, and whereby each storage door independently rotates outward when deployed.

Another object of the present invention is to provide a storage door having a controlled deployment, whereby one or more dampers disposed between the storage door and the front overhang resist downward motion of the storage door to assist lowering thereof.

Another object of the present invention is to provide a storage door with one or more fluid cylinder dampers disposed between the storage door and the front overhang. The fluid cylinder dampers resist downward motion of the storage door to assist lowering of the storage door.

Another object of the present invention is to provide a storage door that further comprises one or more fluid spring cylinder dampers disposed between the storage door and the front overhang. The fluid spring cylinder dampers resist outward motion to assist deploying of the storage door, and assist closing motion of the storage door when stowing of the storage door.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
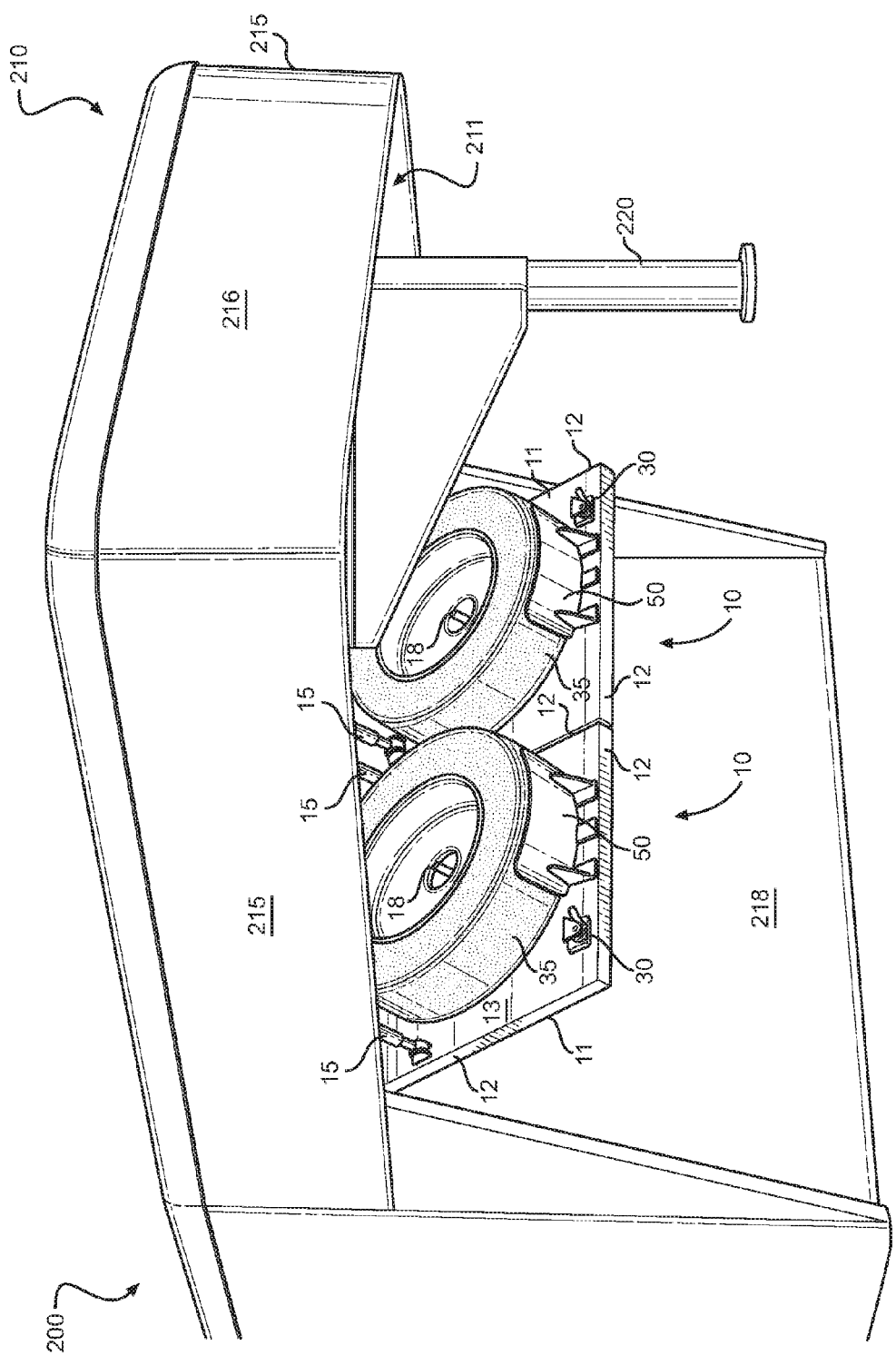
FIG. 1 shows a frontal perspective view of the trailer vehicle of the present invention, as well as the storage doors of the present invention in a deployed state.

Reference is made herein to the attached drawings. Like reference numerals are used throughout the drawings to depict like or similar elements of the trailer vehicle of the present invention. For the purposes of presenting a brief and clear description of the present invention, the preferred embodiment will be discussed as used for providing a trailer vehicle with an additional and unique storage capacity. The figures are intended for representative purposes only and should not be considered to be limiting in any respect.

The present invention comprises a trailer vehicle that is preferably towed behind a towing vehicle, whereby the trailer vehicle comprises a front overhang portion (gooseneck) and a fifth wheel connector. The trailer vehicle includes additional storage room above the fifth wheel connector and within the front overhand portion. In addition, the present invention contemplates deployable doors that provide access to the interior volume of the front overhang portion. This allows the user to store cargo therein, or necessary tools and equipment for the road, such as spare tires and the like. Overall, the present invention provides new and novel access to a traditionally unused or difficult-to-access area of an enclosed, fifth wheel trailer.

Referring now to FIG. 1, there is shown a frontal perspective view of the trailer vehicle of the present invention. The trailer vehicle 200 comprises a trailer body 200 having a chassis, trailer wheels, a leading end, and a trailer end. The leading end of the trailer comprises a front overhang 210 extending therefrom. The front overhang 210, or gooseneck, extends from the front of the trailer body 200 and forms an L-shaped region within which to accept the rear of the towing vehicle therein. More specifically, the front overhang 210 comprises a protruding portion of the trailer vehicle that is disposed over the connection with the towing vehicle. In one embodiment, the front overhang 201 comprises a rectangular structure having side surfaces 215, a leading surface 216, an underside 211, and a roof surface. Along the underside 211 is a fifth wheel connector 220, or trailer kingpin. The connector 220 is used to secure the trailer vehicle to the fifth wheel of a towing vehicle, while the front overhang 210 extends thereover.

The present invention contemplates one or more storage doors 10 that allow access into the interior of the front overhang 210, thereby allowing the front overhang interior to be utilized for storage or for additional cargo. Each storage door 10 is substantially aligned with a surface of the front overhang 210 when stowed, and rotates outward when deployed. It is preferred that the storage doors 10 extend downward from the lower surface of the front overhang 210, as shown in FIG. 1; however it is contemplated that the storage doors may be provided along the sides 215, front 216, other surface of the front overhang 210 for access thereinto.

Figure 2:
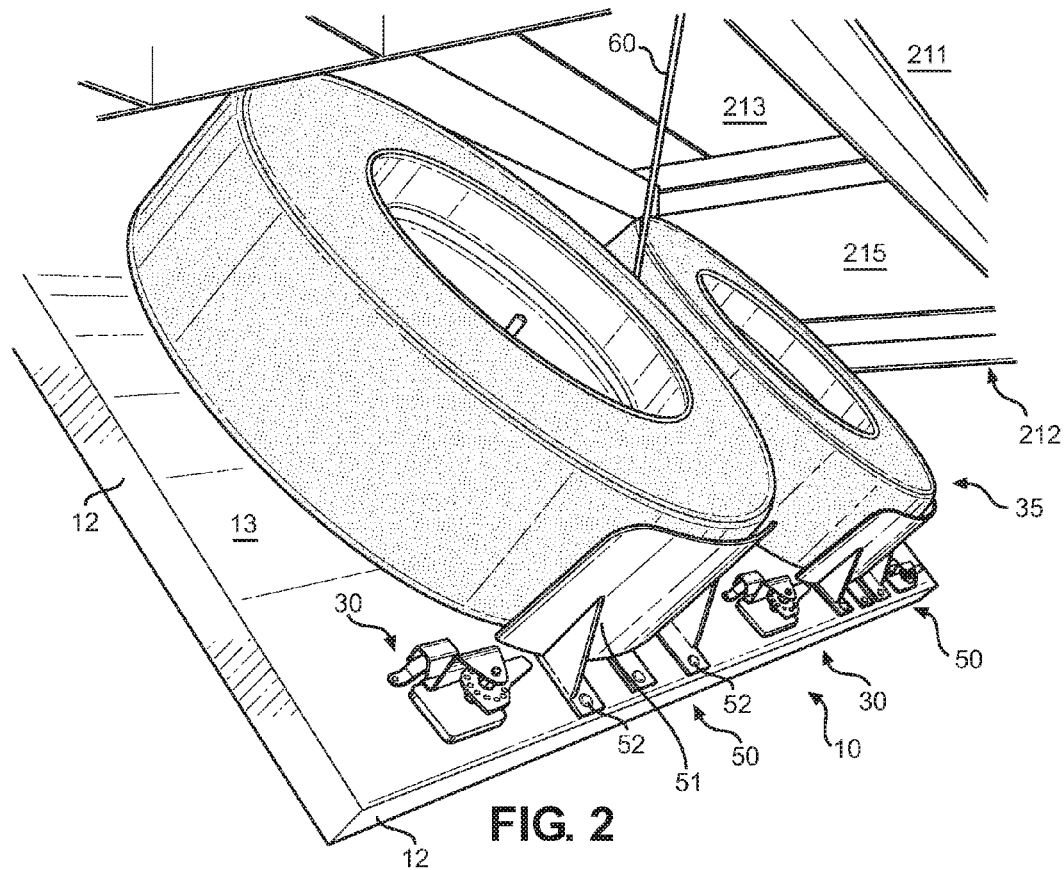
FIG. 2 shows a view of an embodiment of the trailer vehicle in which a single storage door is provided.

In some embodiments, the storage door (or doors) 10 are simply access doors, which open and close to control access to the interior of the front overhang 210. In other embodiments, the storage doors may provide hardware for supporting equipment, or include storage capacity themselves. As shown in FIGS. 1 and 2, in one embodiment the storage doors may be designed to support spare tires 35 thereon. The spare tires 35 are supported on the interior surface 13 of each door 10, and are housed within the interior of the front overhang 210 when the storage door 10 is in a stowed state.

The storage doors 10, which may range from a singular storage door to several, are preferably hinged from a surface of the front overhang and pivot between a stowed and deployed state. The storage door 10 has a first edge that is hingedly affixed to the front overhang and is hingedly attached thereto. The storage door 10 also has a second edge 12 that comprises one or more latches 30 to secure the storage door 10 to the front overhang in a stowed state. The storage door 10 may comprises any shape, but is preferably a planar surface with a pair of side edges 11, a first edge hingedly affixed to the trailer, and a second end 12 opposite of the first edge. Alternative door shapes are contemplated, inasmuch as they are deployable from a surface of the front overhang and are securable thereto.

Referring to FIGS. 1 and 2, a specific embodiment of the present invention is shown, in which the storage door 10 is used to support a wheel and tire thereon. In this embodiment, the interior surface 13 of the storage door comprises one or more tire saddles 50 thereon to support a tire 35. The tire saddles 50 are disposed adjacent an edge of the storage door 10, and preferably comprise rounded, upstanding flanges 51 that are connected 52 to the storage door and used to support the outer radius of a tire 35 placed on the interior surface 13 of the storage door 10. In the case of a storage door 10 that lowers when deploying, the tire saddle 50 supports the tire along the second edge 12 of the door 10 and prevents sliding motion. In addition to the tire saddle 50, the interior surface 13 of the door 10 may comprise wheel hub posts 18 extending upwards therefrom. The wheel hub posts 18 are inserted through the hub of the wheel that is supporting the tire 35. Together, the wheel hub posts 18 and saddles 50 maintain wheels and tires on the interior surface 13 of the storage door while the trailer vehicle is in motion, and when the storage door 10 is being deployed. The wheel hub posts 18 may simply comprise upstanding posts; however, it is also contemplated that fasteners or hub-engaging hardware be employed on the wheel hub post 18 to secure the wheel to the storage door 10.

Figure 3:
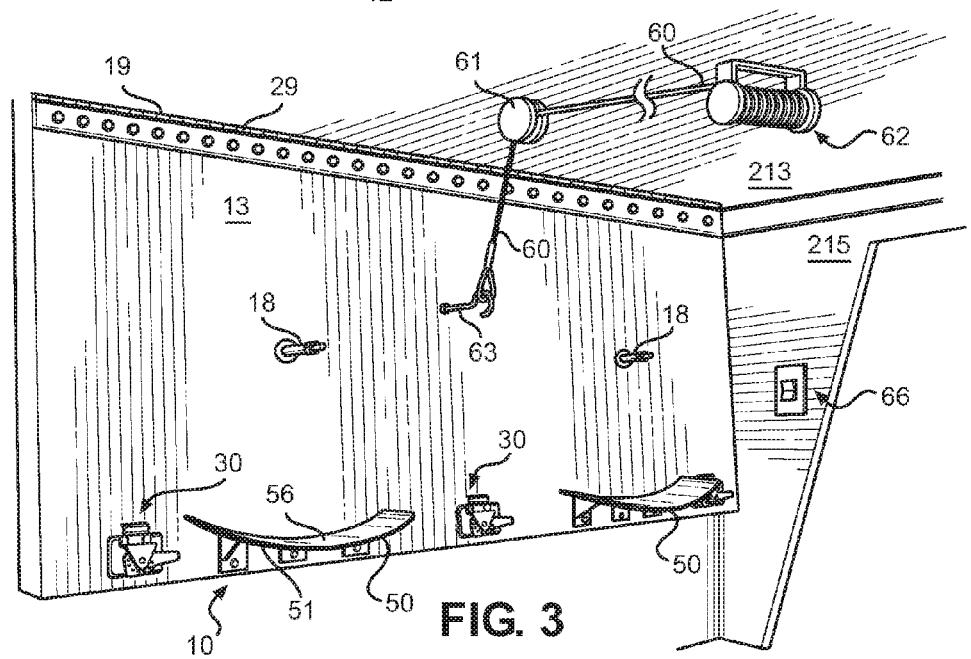
FIG. 3 shows a view of the cable and spool system that controls lowering and raising of the storage door.

Referring to FIGS. 2 and 3, there are shown embodiments of the present invention. In this embodiment, the one or more storage doors 10 are supported by a cable 60 and spool 62 system, which assists lowering and optionally assists raising the storage door 10. The storage door 10 is hingedly affixed along a first edge 19 to the trailer overhang via a hinge 29. This allows the door 10 to pivot between a stowed state, and a deployed state. To assist deploying the door 10, the door may be supported by a cable 60, which connects to the interior surface 13 of the door 10. The cable 60 is supported by a spool 62, which controls the rate at which the cable 60 is unwound. The spool 62 may comprise a one-way, spring-biased spool that biases the cable 60 onto the spool and thus resists free motion of the door 10. Alternatively, the spool 62 comprises a winch, which can control the rate of the cable leaving and entering the spool.

In one embodiment, the spool 62 is an electric winch that is powered by a power source and controlled by a switch 66. The user can activate the winch 62 in one of two ways, thereby causing the cable 60 to extend from the spool 62, or retract and re-spool thereonto. In any embodiment, the cable 60 may also be routed over an intermediate pulley 61, which adds mechanical advantage and allows for ideal placement of the cable 60 within the interior of the trailer overhang.

In still yet another embodiment, the distal end of the cable 60 affixes to the door interior surface 13 using a closed loop that engages a hook hardware article 63. This allows a user to removably affix the cable 60 to the door 10, and optionally separate the two after the door has been fully deployed. The user can remove the cable 60 and use the cable 60 and spool 62 to lift items into the interior of the trailer overhang. This includes lifting heavy cargo items, as well as heavy spare tires onto the saddles 50 of the storage door 10. Larger truck tires are heavy, and the user may require the assistance of a powered spool 62 (i.e. a winch) when placing a tire onto a saddle 50 and over a wheel hub post 18. The user can then reattach the cable 60 to the hook 63 to lift the door 10 back into a stowed state.

Figure 6:
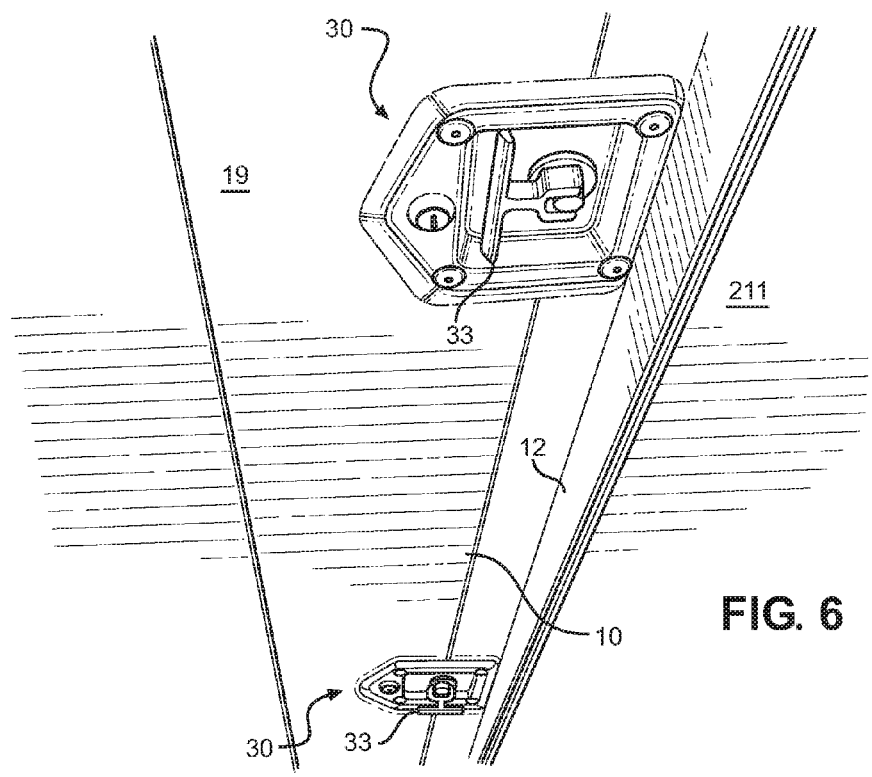
FIG. 6 shows a view of the storage door in a stowed state, along with the latches that secure the second edge of the storage door to the front overhang of the trailer vehicle.

When the door 10 is aligned with the overhang of the trailer and the door 10 is in a stowed state, the user engages one or more latches 30 along the edge of the door. The latches 30 secure the door to the overhang and prevent the door 10 from inadvertently opening while the trailer is in motion. The latches 30 may comprise movable arms that engage other hardware in the overhang, including a strike plate or the like. As shown in FIG. 6, the latches 30 preferably have access along the exterior surface 19 of the door, whereby the user can engage and release the latch 30 using a hand lever 33 or the like. It is not desired to limit the specific type of hardware used to secure the door in a closed state to the overhang portion. Rather, it is contemplated that one or more suitable hardware article may be used and deployed by one skilled in the art to secure the storage door 10 to an adjoining surface 211. The hardware article may be disposed along an edge 12 of the door 10, and engage corresponding hardware in a frame or along the periphery of the door within the overhang portion.

Figure 4:
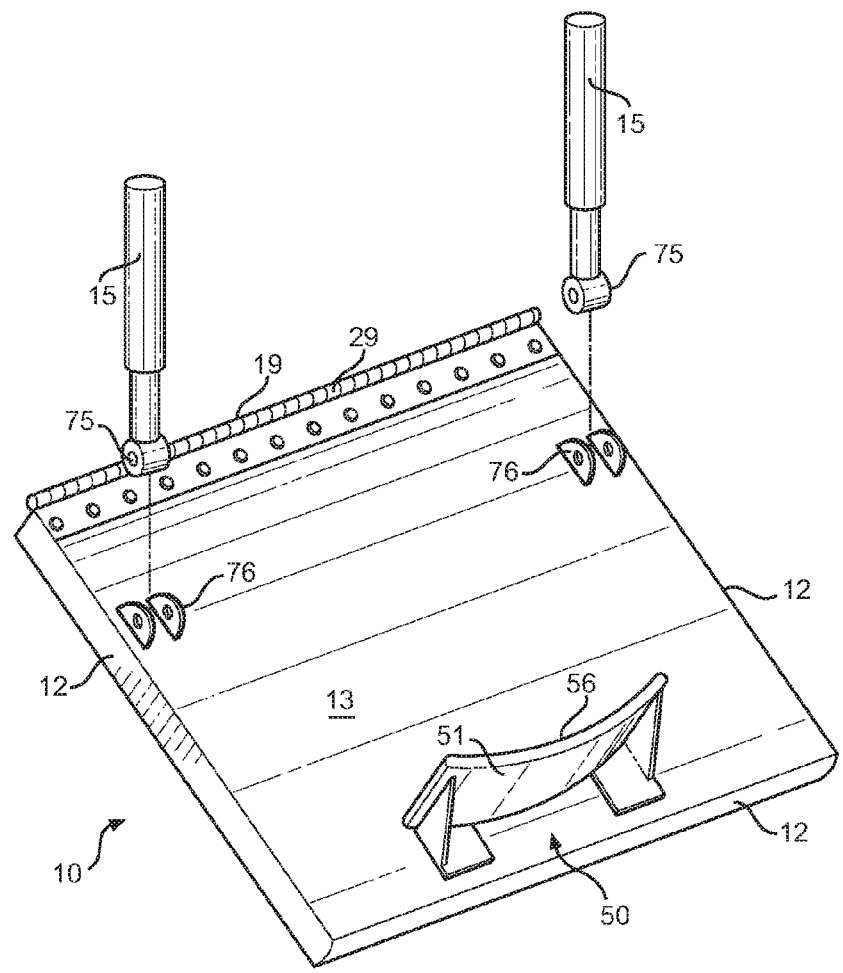
FIG. 4 shows a view of the fluid damper or fluid spring damper system that assists with movement of the storage door.

In addition to a winch-controlled storage door, alternative embodiments are contemplated. These include embodiments without assistance, those with spring-damper systems, and other means of controlling the speed with which a door opens or the extent to which assistance is provided the user when closing the door. As shown in FIG. 4, the storage door 10 may include one or more dampers 15 disposed between the door 10 and the trailer overhang. In one embodiment, the dampers 15 are fluid (i.e., gas, liquid, etc.) dampers that resist free motion of the door when lowering or otherwise extending. This allows controlled deployment of the door 10.

Alternatively, the dampers 15 may comprise fluid spring cylinder dampers, which include a fluid damper and a spring element. The fluid (i.e., gas, liquid, etc.) resists motion (i.e. dampens) the storage door while deploying, and the springs are used to assist stowing the door 10 against the overhang (i.e. returning the door to a closed position). The fluid dampers 15 may be such that they resist in one direction (i.e. during extension/rebound), and do not resist when closing the doors 10 (i.e. during compression). The springs may be disposed within the dampers 15, and are extended when the door 10 is deployed. In this way, the doors apply a return force on the door 10 such that the force necessary to close the door 10 is reduced for the user. In one embodiment, the dampers 15 have a lower end 75 that affixes to door. The lower end 75 engages a clevis 76 along the interior surface 13 of the door and adjacent one edge 12 thereof.

Figure 5:
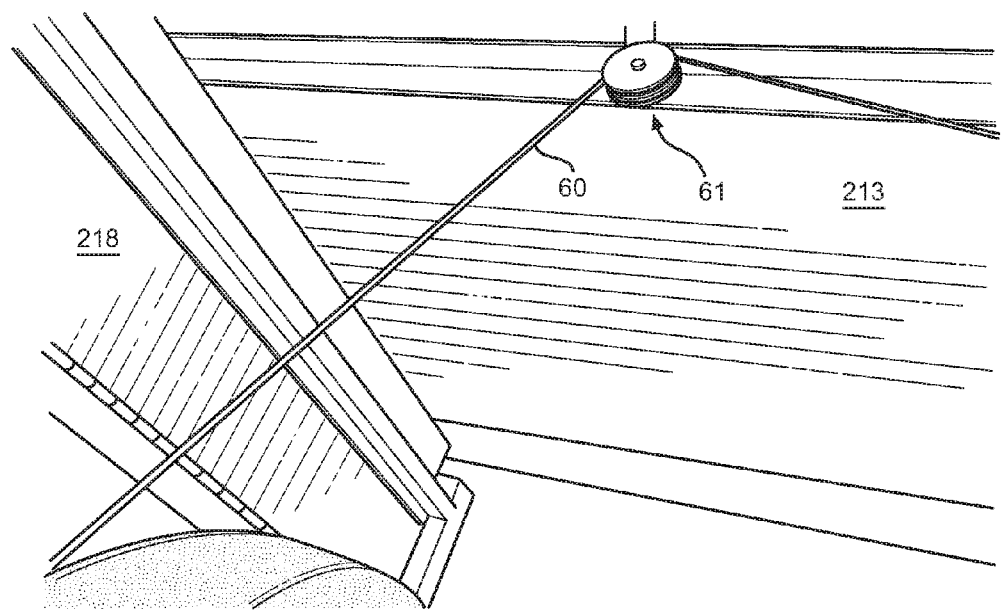
FIG. 5 shows a view of the enclosure within the front overhang of the vehicle trailer, as well as a view of the cable and pulley used to assist motion of the storage door.

Referring to FIGS. 2, 3 and 5, embodiments of the overhang interior volume are shown. In one embodiment, the interior volume of the 212 of the overhang is segregated, and the storage doors 10 access an enclosed compartment therein (i.e. an enclosure therein). The enclosure is substantially enclosed and has a distinct interior volume bounded by enclosure walls 213, 218. Furthermore, the opening of the enclosure is coextensive with the storage door 10 such that the storage door 10 provides access thereinto and not into the remaining interior of the overhang. In other embodiments, the interior volume 212 of the front overhang is open, and the storage doors 10 provide access to the entire interior volume of the front overhang.

Overall, the present invention comprises a fifth wheel trailer having a front overhang (i.e., a gooseneck) that engages the lead vehicle within its flatbed area. Within the front overhang is a deployable storage door. The door may be lowered manually, or lowered using a tool or a powered winch. The door provides access into the interior of the front overhang for accessing the entire cargo volume in the trailer. In one embodiment, the storage door (or doors) are specifically designed to carry spare tires, whereby the tires are supported therein and accessible when the door is deployed. In other embodiments, the doors provide access to a general storage area in the trailer front overhang. The trailer front overhang may comprise a single storage door, or one or more storage doors that are substantially aligned with the front overhang when stowed, and whereby each storage door independently rotates outward when deployed.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer storage compartment, comprising:
   a vehicle trailer having a trailer body, wheels, and a leading end;
   a front overhang extending from the leading end of the vehicle trailer;
   the front overhang having a lower surface, a front end, sides, an upper surface, and an interior volume;
   whereby the front overhang further comprises a storage door that is substantially aligned with a surface of the front overhang when stowed, and rotates outward when deployed;
   the storage door having a first edge that is hingedly affixed to the vehicle trailer;
   the storage door having a second edge that comprises one or more latches to secure the second edge to the front overhang and the storage door in a stowed state;
   whereby the storage door provides access to the interior volume of the front overhang when deployed;
   wherein the storage door is substantially aligned with the lower surface of the front overhang when stowed, and rotates downward when deployed.

2. The trailer storage compartment of claim 1, further comprising:
   a spool and pulley system to assist movement of the storage door while raising and lowering the storage door;
   the spool and pulley system further comprising a cable wound around a spool, whereby the cable extends from the spool to a pulley mounted to the front overhang and above the storage door;
   whereby the cable secures to the storage door;
   whereby the spool places tension on the cable to assist opening and closing the storage door.

3. The trailer storage compartment of claim 2, whereby the spool is disposed on a winch, which controls rotation of the spool and an extent of the cable that is extended from spool.

4. The trailer storage compartment of claim 2, whereby the spool is disposed on an electric winch, which controls rotation of the spool and an extent of the cable that is extended from spool.

5. The trailer storage compartment of claim 4, further comprising a switch to control rotation of the electric winch.

6. The trailer storage compartment of claim 2, whereby the cable affixes to a hook on the storage door and is releasable therefrom.

7. The trailer storage compartment of claim 1, further comprising:
   an enclosure disposed within the front overhang;
   the enclosure being substantially enclosed, having an interior volume, and having an opening that is coextensive with the storage door;
   whereby the storage door provides access to the interior volume of the enclosure.

8. The trailer storage compartment of claim 1, wherein:
   the storage door further comprises an interior surface that is enclosed by the front overhang when the storage door is in a stowed state;
   whereby the interior surface further comprises one or more tire saddles thereon;
   the tire saddles being disposed adjacent to the second edge of the storage door, and comprising rounded flanges adapted to support the outer radius of a tire placed on the interior surface of the storage door;
   whereby the tire saddles support a tire on the storage door when the storage door rotates outward.

9. The trailer storage compartment of claim 1, whereby the front overhang further comprises one or more adjacent storage doors that are substantially aligned with each other when stowed, and whereby each storage door independently rotates outward when deployed.

10. The trailer storage compartment of claim 1, further comprising:
    one or more dampers disposed between the storage door and the front overhang;
    the dampers resisting downward motion of the storage door to assist lowering of the storage door.

11. The trailer storage compartment of claim 1, further comprising:
    one or more fluid cylinder dampers disposed between the storage door and the front overhang;
    the fluid cylinder dampers resisting downward motion of the storage door to assist lowering of the storage door.

12. The trailer storage compartment of claim 1, further comprising:
    one or more fluid spring cylinder dampers disposed between the storage door and the front overhang;
    the fluid spring cylinder dampers resisting outward motion of the storage door to control deploying of the storage door;
    the fluid spring cylinder dampers assisting inward motion of the storage door to assist stowing of the storage door.

* * * * *